Sept. 8, 1959 G. A. MacLEOD 2,902,912
CAMERA
Filed June 6, 1956 2 Sheets-Sheet 1
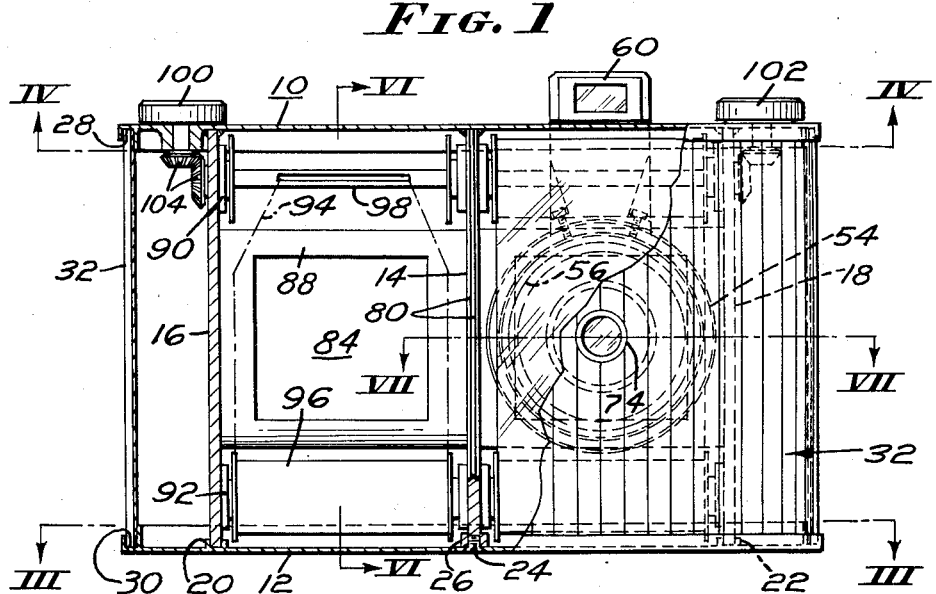
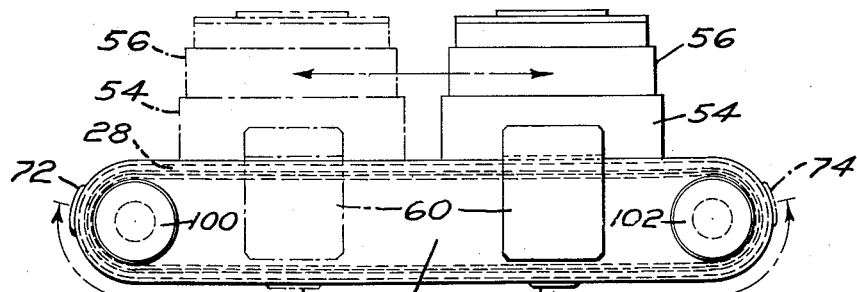
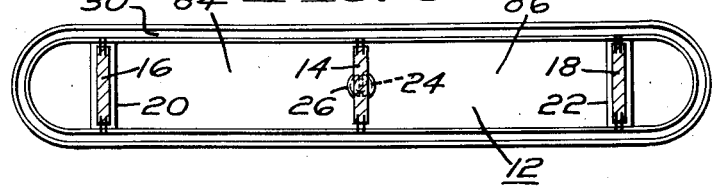
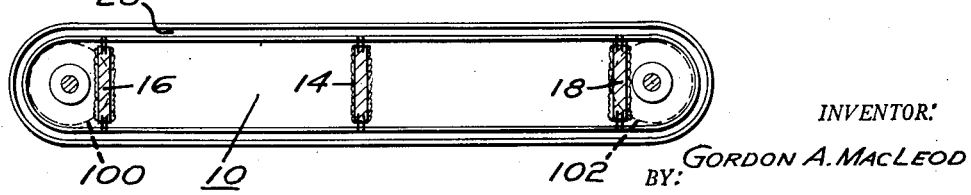
INVENTOR:
GORDON A. MACLEOD
BY: Bean, Brooks, Buckley & Bean,
ATTORNEYS.

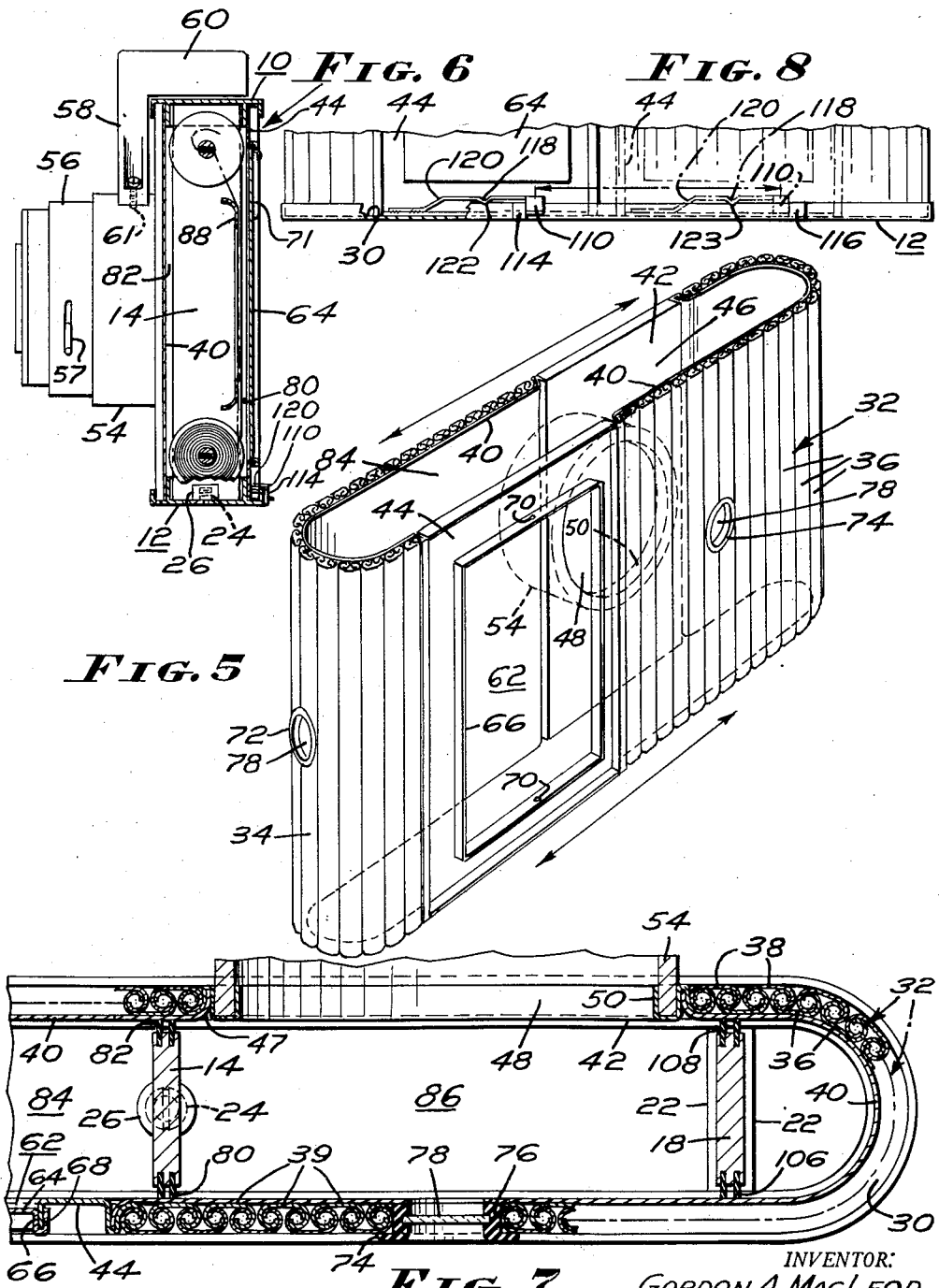

United States Patent Office 2,902,912
Patented Sept. 8, 1959

2,902,912

CAMERA

Gordon A. MacLeod, Buffalo, N.Y.

Application June 6, 1956, Serial No. 589,787

9 Claims. (Cl. 95—31)

This invention relates to photography and more particularly to cameras of the kind having accommodations for a plurality of separate photosensitive elements for selective exposure through a single objective.

It has been recognized that it would be desirable to have a practicable camera structure wherein costly parts of the camera, such as the lens structure, would be arranged for selective cooperation with a plurality of exposure chambers so that, for example, the camera could be loaded with a plurality of different films or other photosensitive materials for selective exposure through the common lens system at the will of the operator. It will be understood that such a camera would be highly useful to a photographer who wishes to take occasional and interspersed black and white and color photographs, or on other occasions, a series of photographs containing more exposures than can be accommodated on a single film of desired length or capacity.

Although roll type films may have capacity for many exposures, there is always an end to that capacity and it may be inconvenient or impossible to reload a conventional camera without loss of a picture taking opportunity. On the other hand, the greater the capacity of the roll film, the more likely that it will be inconvenient for the taking of mixed color and black and white pictures, when used in a conventional camera. The present invention provides a practicable plural exposure chamber camera which enables a rapid and facile transfer of the objective to a second exposure chamber when it is desired to change to a different kind of film therein or when the film or the like in the first chamber is fully exposed, as well as enabling reloading of either chamber while the other remains ready for instant use.

Various cameras have been proposed heretofore with the announced desire to provide a plural exposure chamber camera, but such cameras have been characterized by awkward and complex constructions which are inconvenient to use and wherein less than maximum dual use is made of the camera parts. For example, the problem of masking the film not in use has presented difficulties, and solutions proposed for this problem have had disadvantages; thus in some cameras a separate shutter arrangement for each exposure chamber has been required. Also prior structures have failed to make dual use of a single view finder and/or range finder mechanism, as well as other parts, in a fully coordinated position transfer manner.

In accordance with the present invention a simple and inexpensive camera structure is provided, which is similar in shape to types of cameras which have gained wide acceptance as being convenient to handle and use, while providing a plurality of exposure chambers in side-to-side orientation, with a single lens, shutter and view finder mechanism arranged to be readily shiftable laterally for operative cooperation with the various exposure compartments at the will of the operator. A major feature in this camera construction is the provision of a continuous flexible wall structure forming the front, back and sides of the camera body and carrying the various components which are desirably orientable in a selective manner with respect to the various compartments.

Accordingly, in one form of the camera, the flexible wall carries a lens-shutter-view finder structure, a film changing access door structure, and film exposure number viewing window means, in such manner that this organization is shiftable in the circuit of the continuous wall so that the parts enumerated are brought into cooperative relation with the various exposure chambers in an automatically relatively oriented manner. By this construction, when the lens-shutter structure is disposed for exposure of one film, an exposure number reading window is automatically in position for use with that film and the film changing door is disposed for access to a companion film. Since the shiftable flexible wall is continuous there is no leakage of light to the interior of the camera during the shifting operation, and means are provided to isolate one film chamber from the other so that there is no unwanted admission of light to one chamber when the other is opened for reloading.

Accordingly a major object of the invention is to provide an improved camera having means for selective exposure of a plurality of separate photosensitive elements.

Another object of the invention is to provide a camera as aforesaid which is simple and convenient to use and inexpensive to manufacture, without sacrifice of high quality results of operation.

Still another object of the inveniton is to provide a camera as aforesaid in which maximum plural use of camera elements is made, particularly the more expensive elements such as the lens, shutter and view finder structures.

Other objects and advantages of the invention will appear from the foregoing preliminary description and the more detailed description hereinafter and from the appended claims, as well as from the drawings, wherein:

Fig. 1 is a rear elevation, partly broken away, of a camera embodying the present invention;

Fig. 2 is a top view of the camera of Fig. 1, showing, in phantom line, an alternate position to which the lens and associated parts may be shifted for exposure of a second film;

Fig. 3 is a sectional view taken about on line III—III of Fig. 1;

Fig. 4 is a sectional view taken about on line IV—IV of Fig. 1;

Fig. 5 is a perspective view of the camera body movable wall assembly;

Fig. 6 is a sectional view taken about on line VI—VI of Fig. 1;

Fig. 7 is an enlarged fragmentary horizontal section, taken about on line VII—VII of Fig. 1, showing details of the flexible wall assembly of the camera body and of film chamber defining partitions cooperating therewith; and Fig. 8 is a fragmentary rear elevation, partly in section, of the camera of Fig. 1.

Referring now more particularly to the drawings, the preferred embodiment of the invention illustrated includes a camera body frame comprising top and bottom wall members 10, 12 interconnected by a central, exposure chamber separating partition 14 and two side web members or partitions 16, 18. Conveniently, the three partitions 14, 16, 18 may be permanently attached to the top wall member 10 as shown and may mount the lower wall 12 in a detachable manner as by tongue and groove connections 20, 22 between the side partitions and the bottom wall and a screw secured connection 24 between the bottom wall and a small enlargement or lug 26 on the central partition 14.

In the construction illustrated, the top and bottom wall members 10, 12 are provided with peripheral U-shaped tracks or channels 28, 30 which face each other so as to receive and mount the top and bottom edges of a flexible, movable wall assembly 32 constituting an important feature of the invention. The flexible portions of the wall 32 may be of any suitable material and preferably are of a material of the kind comprising articulated or adjacently inter-hinged elongate elements, similarly to arrangements which have been employed in various types of "rolling" closures for roll-top desks and other uses.

As an example of a suitable "rolling wall" construction, the flexible material 34 of the wall 32 is shown in detail in Fig. 7 to comprise alternately oppositely facing flat or leaflike elements 36, 38 having curled edges which interengage in spiral-like fashion with the curled edges of the adjacent members to provide a hinged interconnection therewith as shown. It will be seen that the leaf-like elements are shaped and arranged to provide an inner surface to the wall flexible portions 34 composed chiefly of flat surfaces as shown at 39, and in order to give the wall good light excluding properties, it is preferred that it be lined, as with a felt-like material 40 which may be readily cemented or otherwise adhered to these flat surfaces as shown. Suitable means are provided to light seal the flexible wall 32 to the top and bottom wall members 10, 12, and to this end the felt or similar liner 40 may extend into the wall mounting tracks 28, 30 for providing a seal thereto as well as for facilitating ease and smoothness of motion of the wall in the tracks.

At positions in opposite portions of the circuit of the endless movable wall member 32, which positions will not be brought into the curved end portions of the tracks 28, 30 during normal and proper use of the camera as will appear more fully hereinafter, are lens structure and access door mounting frame or plate members 42, 44 forming parts of the flexible or movable wall structure 32 and being connected to the articulated members 36, 38 forming the flexible portions 34 thereof to complete the circuit of the wall structure.

As shown the lens mounting wall plate member 42 is in the form of a panel having outwardly turned top and bottom edges, giving the panel a thickness at the tracks 28, 30 equal to the internal widths thereof. The generally flat surface 46 at the face of the plate 42 forming the inner side of the movable wall 32 is thus disposed in alignment with the inner face of the liner 40, the liner being secured to the plate as shown at 47 so that a continuous light seal thereto is provided. While the liner could be made to extend across the top and bottom portions of the inner face of the plate 42, the foregoing arrangement is preferred since it permits a close and accurate sliding fit of the lens plate in the tracks, which fit will provide an adequate light seal and will locate the lens more accurately. With this accurate fit, the top and bottom edges of the returned and curled sides of the panel 42, together with the liner clinched therein as shown at 47, will provide a seal with the bottoms of the tracks to complete the light-tight arrangement. The lens mounting plate 42 is provided with a circular aperture 48 bounded by an outwardly turned flange 50 which mounts, as by being brazed thereto, a tubular structure 54 forming the base of the lens and shutter housing 56 of the camera, which housing mounts a lens and shutter structure which may be of any suitable type and is therefore not shown in detail. A shutter release or trigger is indicated at 57 on the showing of this housing.

In addition to carrying the lens and shutter housing 56, the tubular sleeve 54 mounts an upwardly extending arm 58 of a view finder 60, as by means of screws 61, which, being thus carried on the lens base structure, is maintained in proper orientation with the lens as the latter is shifted from side to side as will be described.

In the same manner as the lens mounting plate 42, the access door mounting frame or plate 44 makes a close sliding fit with the tracks, is articulated to the adjacent rolling wall structure 34, and is provided with a flat inner surface in alignment with the adjacent inner surface of the liner 40 to which it is secured, all as in the aforedescribed light-tight arrangement. Like the plate 42, the plate 44 is in the nature of a frame having a central aperture 62 which in this case is rectangular and mounts a removable access door 64 in a light-tight manner, as by an out-turned flange 66 which borders the aperture 62 and forms a tongue structure received by a corresponding groove formation 68 on the door. The door may be secured in place by a snap connection between dimples (not shown) on the door and corresponding detents 70 on the door frame flange. A handle or finger ring 71 may be provided for opening the door.

In addition to the lens and access door mounting plates 42, 44, the flexible wall member 32 carries a pair of exposure number viewing windows 72, 74 in flanking relation to the access door, each of these windows being conveniently constructed in the form of a circular aperture in one or more of the articulated members. The circular apertures for these windows each mount, as by means of an eyelet 76 cemented in place, a window light 78 of material which is suitably transparent but preferably colored so as to minimize danger of unwanted exposure within the camera. Where the window apertures embrace more than one of the articulated elements forming the flexible wall material 34, the relative motion of such articulated elements may be accommodated by forming the window frame or eyelet element 76 of flexible or resilient material.

It will be seen that the central partition wall 14 divides the interior of the camera body into two exposure chambers, and to prevent leakage of light from one chamber to another means are provided to seal this wall 14 to the inner faces of the adjacent movable wall 32, and to this end felt or other flexible wipers 80, 82 may be mounted in the side edges of the partition 14 so as to extend into wiping bearing relation with the liner 40 of the movable wall. Each of the exposure chambers 84, 86 so separated is provided with an exposure frame structure 88 and film spool mounting means 90, 92 which may be of standard construction so as to train film 94 from a roll 96 across the film frame 88 to another roll 98 in a conventional manner. In order to minimize the lateral width of the camera, it is preferred that the film winding spools be horizontally disposed as shown. To enable advancing the film, film winding knobs 100, 102 are journalled in the top stationary wall 10 and arranged for driving the film winding mechanisms of the corresponding chambers through suitable right-angular drives, for example by bevel gear connections such as shown at 104.

In addition to adding rigidity to the fixed parts of the camera body structure and mounting the outboard ends of the film spool mechanisms 90, 92, the side partition wall or web members 16, 18 are preferably arranged to define the outer sides of the exposure chambers 84, 86 for minimizing the possibility of entrance of undesired light thereto, and to this end it is preferred that these side wall members 16, 18 be sealed to the movable wall 32 as by wipers 106, 108 which may be identical to the seals 80, 82 at the central partition 14. Preferably also, the camera is so dimensioned so that when one of the windows 72, 74 is in position for use as will be described, the other such window will be disposed at an end position of the camera whereby light entering the latter window will be excluded from the exposure chambers of the camera by the adjacent side wall 16 or 18. During the brief moment that a viewing window may pass from the edge of the film 94 to the adjacent portion 14, 16 or 18, the light therethrough will be intercepted by the corresponding film frame 88.

In use, the lens, shutter, and view finding mechanism may be shifted laterally between the positions shown in Fig. 2, the motion preferably being limited thereto, as by a stop 110 on the lower flange of the door frame plate which abuts stops 114, 116 on the lower wall 12 corresponding to the extremes of the motion. These two operative positions are such that the lens is located in alignment with the respective exposure frames 88 for cooperating therewith. Preferably also, lock means are provided to releasably secure the shiftable assembly in each of the two operative positions, such as may be provided by a detent 118 on a spring arm 120 carrying the stop 110, which detent registers with notches 122, 123 on the lower wall structure 12 in either of the operative positions shown. It will be seen that when the lens, shutter, and view finder assembly is in one of these positions, such as for exposure of the film in chamber 86, the access door 62 will have been automatically moved by the motion of the flexible wall 32 to a position for access to the companion exposure chamber 84 for loading or removal of the film thereof, while a film number viewing window 74 will be disposed in operative relation to the film which the lens structure is in position to expose and the other viewing window 72 will be disposed at an end portion of the camera where it is isolated from the exposure chambers thereof by the adjacent side partition 16. Whenever it is desired to expose film of the companion chamber 84, the lens structure may be simply shifted to the alternate position as shown in phantom line in Fig. 2, and the accompanying movement of the wall 32 will carry the film access door to the opposite exposure chamber 86 and will shift the viewing windows so the opposite one 72 is brought into viewing relation with the film to be used while the companion window 74 is transported to the opposite end of the camera body beyond the adjacent side portion 18.

It will be seen that the flexible wall 32 functions to transport all movable parts to their desired relationship with the fixed parts of the camera, while maintaining an adequate light seal against entrance of unwanted light at all times.

While only one preferred embodiment of the invention has been illustrated and described in detail, it will be understood that the invention may be otherwise embodied within the spirit of the invention and the scope of the appended claims.

What is claimed is:

1. In a dual roll film hand photographic camera, a film housing having two edgewise adjacent film exposing chambers adapted to receive separate rolls of film for exposure therein, said housing comprising first and second walls and a central partition interconnecting the same to separate said chambers, said walls having wall track means continuous about the periphery of each, and an endless flexible wall structure mounted by said track means to move therein and to extend therebetween for forming the remaining exterior wall portions of said film housing, said flexible wall structure comprising lens and shutter structure mount means at a first part thereof and film reloading access door means at a second part thereof displaced in the order of 180 degrees from said first part in the circuit of said flexible wall structure, said flexible wall structure comprising also a pair of film number sighting windows in flanking relation to said access door means and spaced therefrom so that one of said windows is in operative position at the companion chamber when said access door is positioned for access to either chamber.

2. In a plural roll film hand photographic camera, a housing having means for mounting a plurality of separate films in co-planar adjacent orientation, said housing comprising first and second walls having wall track means continuous about the periphery of each, and an endless flexible wall structure mounted by said track means to move therein and to extend therebetween for forming the remaining exterior wall portions of said housing, said flexible wall structure comprising lens and shutter structure mount means shiftable with said flexible structure between positions of operative relation to each of said films, and means confining light admitted through said lens mount means to one of said plurality of films when said mount means is in any one of said positions.

3. In a dual roll film hand photographic camera, a film housing having two edgewise adjacent film exposing chambers adapted to receive separate rolls of film for exposure therein, said housing comprising first and second walls and a central partition interconnecting the same to separate said chambers, said walls having wall track means continuous about the periphery of each, and an endless flexible wall structure mounted by said track means to move therein and to extend therebetween for forming the remaining exterior wall portions of said film housing, said flexible wall structure comprising lens and shutter structure mount means at a first part thereof and film reloading access door means at a second part thereof displaced in the order of 180 degrees from said first part in the circuit of said flexible wall structure, said lens and shutter mount means being shiftable with said flexible wall structure between respective positions of operative relation to the two chambers, with said door means being positioned automatically at the chamber companion to the one at which the lens and shutter mount means is positioned.

4. In a dual roll film hand photographic camera, a film housing having two edgewise adjacent film exposing chambers adapted to receive separate rolls of film for exposure therein, said housing comprising first and second walls and a central partition interconnecting the same to separate said chambers, said walls having wall track means continuous about the periphery of each, and an endless flexible wall structure mounted by said track means to move therein and to extend therebetween for forming the remaining exterior wall portions of said film housing, said flexible wall structure comprising lens and shutter structure mount means at a first part thereof and film reloading access door means at a second part thereof displaced in the order of 180 degrees from said first part in the circuit of said flexible wall structure, said central partition being adapted to make a light-tight seal to the interior of said flexible wall structure when the latter is positioned with said mount means located for exposure of either chamber, whereby said access door may be opened to the adjacent chamber without exposure of the first chamber to light.

5. In a dual roll film hand photographic camera, a film housing having two film exposing chambers in side-to-side orientation, said housing comprising top and bottom walls and a central partition interconnecting the same to separate said chambers, horizontal axis film spool holder means mounted in each of said chambers, and film winding control means for said film holder means mounted in and through said top wall and operatively connected to said holder means, said walls having wall track means continuous about the periphery of each, and an endless flexible wall structure mounted by said track means to move therein and to extend therebetween for forming the front and back and side portions of said film housing, said flexible wall structure comprising lens and shutter structure mount means at a first part thereof and film reloading access door means at a second part thereof displaced in the order of 180 degrees from said first part in the circuit of said flexible wall structure.

6. In a dual roll film hand photographic camera, a film housing having two edgewise adjacent film exposing chambers adapted to receive separate rolls of film for exposure therein, said housing comprising first and second walls and a central partition and opposite end partitions interconnecting the same to form the corresponding ends of said chambers, said walls having wall track means continuous about the periphery of each, and an endless flexible wall structure mounted by said track means to move therein and to extend therebetween for forming the remaining exterior wall portions of said film housing, said flexible wall structure comprising lens and shutter structure mount means at a first part thereof and film reloading access door means at a second part thereof displaced in the order of 180 degrees from said first part in the circuit of said flexible wall structure, each of said partitions being adapted to make a light-tight seal to the interior of said flexible wall structure when the latter is positioned with said mount means located for exposure of either chamber, said flexible wall structure comprising also a pair of film number sighting windows in flanking relation to said access door means and spaced therefrom so that one of said windows is in operative position at the companion chamber when said access door is positioned for access to either chamber, and the other window is in position at the end of said housing adjacent said access door, behind the adjacent end partition, whereby said access door may be opened to either chamber without exposure of the other chamber to light and whereby light passing through the window at the end of said housing is excluded by the adjacent end partition.

7. In a dual roll film hand photographic camera, a film housing having two edgewise adjacent film exposing chambers adapted to receive separate rolls of film for exposure therein, said housing comprising first and second walls and a central partition interconnecting the same to separate said chambers, said walls having wall track means continuous about the periphery of each and an endless movable wall structure mounted by said track means to move therein and to extend therebetween for forming the remaining exterior wall portions of said film housing, said movable wall structure comprising a lens and shutter structure mount panel mounted by said track means to be guided closely thereby at a first part thereof shiftable at the front of said housing and film reloading access door panel at a second part thereof shiftable at the back of said housing and displaced in the order of 180 degrees from said first part in the circuit of said movable wall structure, said movable wall structure comprising also flexible means interconnecting said panels to complete the circuit of said movable wall structure, said track means being straight at the front and back of said housing and curved in its ends.

8. In a hand photographic camera, a housing having means for mounting a plurality of separate photosensitive elements for selective exposure of the same, said housing comprising first and second walls, and an endless flexible wall structure mounted to extend between said walls for forming the remaining exterior wall portions of said housing and to be movable within its circuit with respect to said first and second walls, said flexible wall structure comprising lens mount means shiftable with said flexible structure between positions of operative relation to each of the plural photosensitive elements, and means confining light admitted through said lens mount means to one of said photosensitive elements when said mount means is in any one of said positions.

9. In a dual film hand photographic camera, a film housing having two edgewise adjacent film exposing chambers, said housing comprising first and second walls having wall track means continuous about the periphery of each, and an endless flexible wall structure mounted by said track means to move thereon and to extend therebetween for forming the remaining exterior wall portions of said film housing, said flexible wall structure comprising lens and shutter structure mount means at a first part thereof and film reloading access door means at a second part thereof displaced in the order of 180 degrees from said first part in the circuit of said flexible wall structure for cooperating with each chamber alternately with said mount means, and means providing light-proof shielding between said chambers.

References Cited in the file of this patent
UNITED STATES PATENTS

| | | |
|---|---|---|
| 1,893,439 | Ogden | Jan. 3, 1933 |
| 2,245,606 | Rauch | June 17, 1941 |
| 2,259,084 | Rosenhaft | Oct. 14, 1941 |
| 2,507,926 | Noble | May 16, 1950 |